United States Patent Office 3,276,283
Patented Oct. 4, 1966

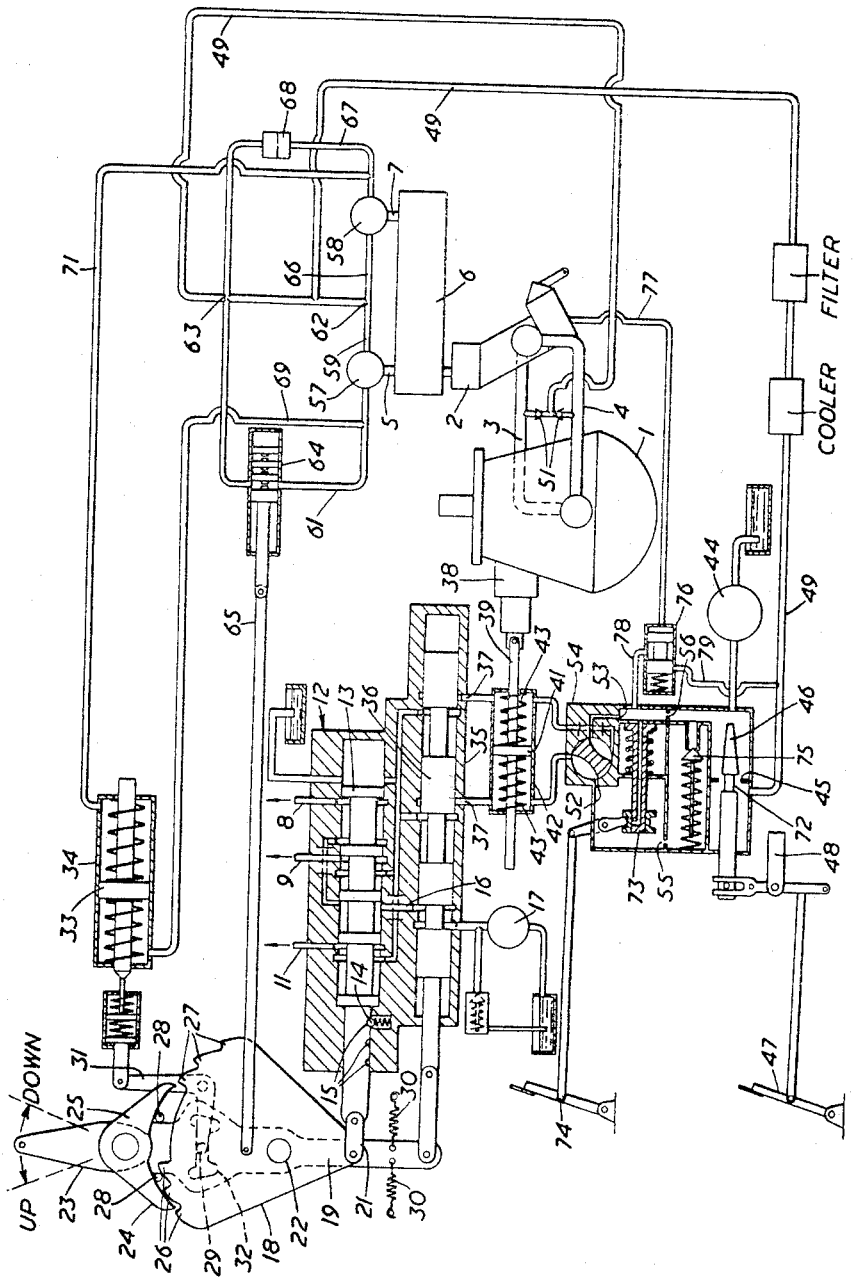

3,276,283
HYDRAULIC APPARATUS
Bertram Carl Kempson, St. Marks, Cheltenham, England, assignor to Dowty Hydraulic Units Limited, Ashchurch, England, a British company
Filed Nov. 27, 1963, Ser. No. 326,482
Claims priority, application Great Britain, Dec. 6, 1962, 46,110/62
3 Claims. (Cl. 74—339)

This invention relates to hydraulic apparatus and more particularly to a hydrostatic power transmission. A hydrostatic power transmission comprises a variable positive displacement pump in hydraulic connection with a fixed or variable positive displacement hydraulic motor. Where such a transmission does not provide a sufficiently large range of speed ratio between pump and motor the transmission may be combined with a mechanical step-change gear box located between the transmission motor and the load for increase of the overall speed ratio and torque ratio range.

In accordance with the present invention a step-change gear box operable in any one of the number of gears having fixed speed ratios is adapted to transmit power from a hydrostatic transmission motor to a load and includes a gear change control element for the gear box adapted during increase of gear speed ratio to make one complete cycle of movements and during reduction of gear speed ratio to make another complete cycle of movements and always to return to a given position on engagement of any gear, the gear change control element during a cycle of movements being arranged to adjust transmission motor speed to tend to synchronise the latter with the driving speed into the gear box required on engagement of the selected gear speed ratio.

The gear changing control element may be arranged during either of its cycles of movements to move a gear selecting element one step in either the speed ratio increasing or decreasing direction.

The gear changing control element may be a pivoted lever, the first cycle of movement being from the given position to a first stop and back to the given position and a second cycle of movement being from the given position in the opposite direction to a second stop and back to the given position. The movement of the gear changing control element to the first stop in the one cycle may be arranged to cause decrease in motor speed whilst movement of the gear changing control element to the second stop may be arranged to cause increase in motor speed.

Alteration in motor speed by the gear changing control element may be in the sense to override a main control of motor speed, the overriding action finishing just before the gear changing control element returns to its given position. By this means motor speed may be temporarily adjusted to give synchronised gear engagement within the gear box. Subsequent to gear engagement within the gear box the motor speed may be considerably altered by the main control.

Where the hydrostatic transmission is driven by an engine the main control may be arranged to adjust motor speed in the sense to prevent the engine from becoming overloaded. For example, the main control may be a speed governor acting on motor speed in the sense to tend to maintain engine speed constant. The main control may act on motor speed to control engine speed by adjustment of the displacement of the transmission pump and/or adjustment of the displacement of the transmission motor.

One embodiment of this invention as applied to the transmission of power in a tractor from the engine to the ground engaging wheels or the like will now be described with reference to the drawing accompanying this specification.

In the drawing the hydrostatic transmission is formed by a variable positive displacement pump 1 driven by an engine (not shown), a positive displacement hydraulic motor 2 and pipelines 3 and 4 interconnecting the pump and motor. The hydraulic motor 2 drives an output motor shaft 5 entering into a mechanical step-change gear box 6. The output shaft 7 from the mechanical step-change gear box is connected to drive wheels or other ground-engaging elements of the tractor.

The gear box is provided with three fixed speed ratios which are engageable independently by supplying hydraulic pressure to any of three pipelines 8, 9 and 11. In the drawing these pipelines are shown extending from a control valve 12 and it will be understood that they extend into the gear box for control of clutches therein. The spool valve member 13 of the valve 12 is locatable in any of three fixed positions by means of a spring-loaded ball 14 and the three recesses 15 in the valve member. According to the position of the valve member 13 any one of the pipelines 8 or 9 or 11 is supplied with hydraulic pressure through passage 16 from a gear pump 17 driven by the engine. Valve 12 also connects to drain any of the pipelines 8, 9 or 11 which are not pressurised.

For adjustment of the spool valve member 13 a pivoted plate 18 is provided of which extension 19 and link 21 make connection to the valve member 13. Plate member 18 is pivotally mounted about a spindle 22. Also mounted on the spindle 22 is a gear selecting lever 23 movable between stops indicated by dotted lines at the words "Up" and "Down." Mounted on the lever 23 are a pair of spring-loaded integrally-formed pawls 24 and 25. Pawl 24 co-operates with three ratchet teeth 26 on plate 18 whilst the pawl 25 co-operates with three ratchet teeth 27 on plate 18. A pair of fixed abutments 28 co-operate with pawls 24 and 25 by cam action on the undersides thereof so that they are able only to engage co-operating teeth 26 or 27 on movement of lever 23 from the central position. Lever 23 may be latched in either of its extreme positions by means of a pawl 29 carried by a bell crank lever 31 and engageable within the ends of a slot 32 in lever 23. Lever 31 may be moved to release pawl 29 from the ends of slot 32 so that lever 23 may return to the central position. For this purpose lever 31 is moved by a hydraulic pressure difference applied between the ends of cylinder 34 on to a piston 33. When the pawl 29 is released springs 30 return the lever 23 to the central position. A valve 35 having a spool valve member 36 is connected for movement by lever 23, the spool valve member 36 occupying any of three positions corresponding to the central and two extreme positions of lever 23. As illustrated, lever 23 is in its central position and the spool valve 36 permits flow from the engine-driven gear pump 17 to passage 16 to engage a gear within the gear box 6. Also as shown, spool valve 36 closes a pair of ports 37.

For adjustment of the displacement of the pump 1 a servomotor 38 is provided extending into the pump, this servomotor being operated by a rod 39. The rod 39 in turn is operated by a piston 41 slidably mounted within cylinder 42. Springs 43 within cylinder 42 operate to centre piston 41 in the absence of pressure difference across the piston. The central position of piston 41 represents zero displacement of the pump 1, movement to the left as shown in the drawing giving forward displacement to the pump and movement to the right giving reverse displacement to the pump.

For the purpose of controlling displacement of the pump 1 an engine-driven gear pump 44 is arranged to deliver liquid at a rate proportional to engine speed through an orifice 45. Within the orifice 45 a tape needle 46 is located which is adjustable in position by an engine speed control lever 47, which is connected also by means of link 48 to an engine governor operating on the fuel supply to the engine. Liquid delivered by gear pump 44 will enter the pipe 49 after leaving the orifice 45. From the pipe 49 the liquid is delivered to a pair of non-return valves 51 into the transmission pipeline 3 or 4 at lower pressure. By suitably selecting the taper on needle 46 a predetermined constant pressure drop may be obtained if the engine is running at a speed determined by the governor for any setting of the lever 47. The pressure drop across the orifice 45 is fed by way of restrictors 55 and 56, connections 52 and 53 and reversing valve 54 to the ends of cylinder 42. For full displacement from the pump 1 the pressure difference between the ends of the cylinder 42 is such as to urge piston 41 to the left as seen in the drawings. The arrangement of the engine governor control lever 47 to act jointly on the engine fuel governor and on the engine governor formed by pump 44, orifice 45 and servo piston 41 to control displacement of the pump 1 is described more fully in my copending application No. 279,849, now U.S. Patent 3,167,907.

For the purpose of adjusting the speed of the motor output shaft 5 so that engagement of any gear in the gear box 6 may be affected without shock through the transmission, there is provided a pair of gear pumps 58 and 57 driven respectively by the motor output shaft 5 and the gear box output shaft 7. These pumps may be driven in either one direction or the other depending on whether forward or reverse displacement is selected for the pump 1. The pump 57 is associated with the liquid flow circuit comprising pipes 59 and 61 and the part of pipe 49 between connectors 62 and 63. In the pipe 61 an adjustable restrictor 64 is located which is adjustable to any of three predetermined positions by means of a link 65 extending back to the plate 18. Associated with the pump 58 is a liquid circuit comprising pipes 66 and 67 and the portion of pipe 49 between connectors 62 and 63. In pipe 67 a fixed orifice 68 is located. Pipes 69 and 71 extend from the restrictors 64 and 68 to the two ends of the cylinder 34. The pipes 69 and 71 extend from the sides of their respective restrictors opposite to the connectors 63. The arrangement is such that the pressure drops occurring at the restrictors 64 and 68 are opposed to one another and the difference between these pressure drops only is applied to the ends of cylinder 34. Because of the fact that the gear pumps 57 and 58 are reversible it will be clear that liquid will flow in either direction around the circuit associated with each gear pump and, accordingly, that the pressure drops occurring at the restrictors 64 and 68 will vary in direction according to the direction of flow of liquid through them. By virtue of the fact that the two liquid circuits are connected to the pipe 49 carrying low pressure liquid for the transmission, both liquid circuits associated with pumps 57 and 58 are continuously pressurised. Provided that the maximum pressure drops occurring at the restrictors 64 and 68 are lower than the pressure in pipe 49 the difference of the pressure drops across the restrictors 64 and 68 will always act at the ends of the cylinder 34.

When the vehicle having the transmission described is at rest with the engine idling the lever 47 will be located at a position selecting idling speed on the engine fuel governor and at this position notch 72 on the taper pin 46 coincides with the orifice 45. This renders the orifice 45 effectively of a very large size so that little or no pressure drop is produced across it by flow of oil from the pump 44. This will mean that the piston 41 is held in its central position by the springs 43 so that pump 1 is at zero displacement. Accordingly the motor output shaft 5 will not rotate and the vehicle will not move irrespectively of which gear is engaged within the gear box 6. Assume that the valve 12 is in the position indicated in the drawing in which first gear is selected by the supply of oil from the gear pump 17 through passage 16 and pipe 8. The vehicle may be accelerated from rest by moving the lever 47 to increase engine speed and to move the taper pin 46 into the orifice 45 to give a pressure drop at this orifice which cause displacement of piston 41 to the left for forward movement. Pump 1 then supplies liquid to motor 2 which drives the ground wheels through the gear box. Assume now that the driver wishes to change from first gear to second gear within gear box 6. The driver will push lever 23 to "Up" position, this movement causing the pawl 24 to engage tooth 26 to rotate the plate 18 by a predetermined amount. This movement will cause movement of the spool valve 13 which will connect pipe 8 to drain and will connect passage 16 to pipe 9. The pipe 9 leads to the clutch within the gear box 6 for engagement of second gear. Movement of lever 23 to the "Up" position will cause movement of spool valve 36 to the right which will isolate pump 17 from passage 16, thus preventing the application of pressure to pipe 9 and will also connect both of the ports 37 to low pressure. Ports 37 are connected to the ends of cylinder 42. Liquid will flow through the restrictors 55 and 56 and the pressure at the ends of the cylinder 42 will be reduced to a low value even though the engine is running at a speed determined by the fuel governor and there is a substantial flow rate of the pump 44 through the orifice 45. The connection of the port 37 to drain will therefore permit the springs 43 to move piston 41 towards the centre. This will reduce the selected displacement of the pump 1 and the rate of flow of liquid through the pipes 3 and 4 to the motor 2 thus reducing the speed of rotation of the motor shaft 5. Movement of the lever 23 to the "Up" position will cause the pawl 29 to engage the end of slot 32 and lock the lever 23 in the "Up" position. At the instant of pushing lever 23 forward, the restrictor 64 will be adjusted to a smaller size by movement of the rod 65. Instantly the pressure drop at the restrictor 64 will rise giving a pressure difference across the ends of the cylinder 34 to hold pawl 29 in the end of the slot 32. As displacement of pump 1 reduces the speed of the motor output shaft 5 and of gear pump 57 will reduce, thereby reducing the pressure drop of the restrictor 64. The adjusted size of restrictor 64 is such that the pressure drops at the restrictors 64 and 68 can only be equal when the speed of pumps 57 and 58 are in the same ratio as the speed ratio through the gear box of the second gear which is about to be engaged. Thus, when motor speed drops sufficiently so that the pressure drops at the restrictors 64 and 68 are equal, springs in the cylinder 34 will centralize piston 33 to move pawl 29 and to release it from the end of the slot 32, thus permitting lever 23 to move back to the centre position by the loading of spring 30. Movement of lever 23 back to the central position will move spool valve 36 to feed pressure through passage 16 and pipe 9 to the second gear clutch within the gear box 6 to engage second gear. Such movement will also close the port 37 to reverse movement of piston 41 and cause increased pump displacement. In this way at the instant that the second gear clutch in the gear box 6 is engaged, the motor is rotating at an appropriate speed so that no shock is felt through the transmission. A differing load will now be imposed on the engine and the engine speed and pump displacement will settle at values so that the engine is reasonably loaded.

If the vehicle speed again increases and the driver wishes to select third gear, lever 23 is pushed to the "Up" position and the sequence of operations previously described will be repeated with the exception that hydraulic pressure will eventually be fed to the pipe 11 for engagement of the third gear clutch.

In the event that the driver wishes to reduce from a higher gear to a lower gear, for example from second gear to first gear, the lever 23 is pulled to the "Down" position, the pawl 25 engaging a tooth 27 to move plate 18 in the clockwise sense as seen in the drawing. The pawl 29 will engage in the slot 32 to retain the lever in the "Down" position resulting from the fact that orifice 64 is altered by movement of the plate 18 reducing the pressure drop and thus causing a pressure difference to be created between the ends of the cylinder 34. Movement of the plate 18 will also cause movement of the spool valve member 13 to connect passage 16 to pipe 8. The pressure applied to the passage 16, however, is cut off by the movement of the spool valve 36. The movement of the spool valve 36 is to the left as seen in the drawing and it is arranged that such movement will not uncover the ports 37. The fact that no clutch in the gear box 6 is now engaged means that no load can be exerted on the engine and, therefore, that its speed will rise within the range permitted by the engine fuel governor giving an increased pressure drop at the orifice 45. The increase in pressure drop will cause movement of the piston 41 in the pump displacement increasing direction, thus increasing the speed of the motor output shaft 5. When the speed of the motor output shaft 5 has reached a value to produce a pressure drop at restrictor 64 which equals the pressure drop at restrictor 68, the shaft 5 will be synchronised so that the first gear clutch within gear box 6 may be engaged without creating a shock in the transmission. The equalization of the pressure drops at restrictors 64 and 68 releases the pawl 29 permitting lever 23 to move to the central position at which pressure is connected from gear pump 17 to passage 16 causing engagement of first gear.

For driving the vehicle in reverse the valve 54 is moved to the reverse position in which the connections of the passages 52 and 53 to the ends of cylinder 42 are reversed. This will cause the pump to assume a reverse displacement and cause reverse movement of the motor shaft 5. The operation of selecting gears in reverse either of increased or decreased speed ratio follows that substantially as described for the forward direction. The only real difference between the operations lies in the fact that the pumps 57 and 58 are now driven in the opposite direction and produce pressure drops in the opposite sense across the restrictors 64 and 68. However, since the pressure drops are opposed to one another, the operation of piston 33 and pawl 29 remains the same.

If substantial braking of the vehicle is required, a valve 73 may be provided operable by brake pedal 74. Valve 73 connects together the connections 52 and 53 when it is open thus removing the pressure difference at the end of the cylinder 42 to permit the springs 43 to reduce pump displacement towards zero. This reduces the speed ratio of the hydrostatic transmission and thus brakes the vehicle.

A relief valve 75 is provided in parallel with the orifice 45. A spring loading is provided for the relief valve 75 to prevent pressure at orifice 45 rising above a value sufficient to cause complete displacement of the piston 41 in one direction or the other against the loading of springs 43.

In order to prevent excessive transmission pressures being developed between pump 1 and motor 2, a spring-loaded valve 76 is connected through pipe 77 and a shuttle valve (not shown) to the transmission. This spring-loaded valve 76 opens when excessive transmission pressures occur to permit liquid flow through pipes 78 and 79 from the connection 53 to pipe 49. This action will reduce the pressure difference acting between the ends of the cylinder 42 and thus cause reduction in pump displacement which in turn will reduce the excessive transmission pressure.

I claim as my invention:

1. In combination, a step change gear box including an input shaft, an output shaft, and a plurality of clutches engageable one at a time to establish differing fixed gear ratios between the input and the output shafts, a hydrostatic transmission motor connected to drive the input shaft, a gear change control element movable to "Up" and "Down" positions from a central position, clutch control means responsive to movement of the control element from its central position to disengage all clutches, clutch selecting means, rachet means engageable to move the said clutch selecting means one step at a time on movement of the gear change control element from its central position, locking means for the gear change control element to hold it in one of the "Up" and "Down" positions when moved from the central position, and synchronism detecting means for each clutch selected by the clutch selecting means to release said locking means on occurrence of synchronism for the clutch.

2. The combination claimed in claim 1, including overriding speed control means for the transmission responsive to movement of said gear change control element to the "Up" position to increase motor speed and responsive to movement of said gear change control element to the "Down" position to reduce motor speed.

3. The combination claimed in claim 1, including a power driven variable positive displacement pump hydraulically connected to supply liquid under pressure to the motor, and displacement selecting means for said pump to determine motor speed, said overriding speed control means acting on the said displacement selecting means to change the selected displacement on movement of the said gear change control element from its central position.

References Cited by the Examiner

UNITED STATES PATENTS 2,833,160   5/1958   Morgan _____ 74—339

DAVID J. WILLIAMOWSKY, *Primary Examiner.*

FRANK SUSKO, *Examiner.*

H. S. LAYTON, *Assistant Examiner.*